United States Patent

Reams

(10) Patent No.: US 8,386,649 B2
(45) Date of Patent: Feb. 26, 2013

(54) USER INPUT COMMAND RELAYING

(75) Inventor: William R. Reams, Englewood, CO (US)

(73) Assignee: EchoStar Technologies, L.L.C., Englewood, CO (US)

(*) Notice: Subject to any disclaimer, the term of this patent is extended or adjusted under 35 U.S.C. 154(b) by 123 days.

(21) Appl. No.: 12/560,879

(22) Filed: Sep. 16, 2009

(65) Prior Publication Data

US 2011/0063506 A1  Mar. 17, 2011

(51) Int. Cl.
 *G06F 3/00* (2006.01)
(52) U.S. Cl. .......................................... 710/5
(58) Field of Classification Search .................. 710/5
 See application file for complete search history.

(56) References Cited

U.S. PATENT DOCUMENTS

| 5,598,523 | A  | * | 1/1997 | Fujita  | 715/840 |
| 7,865,568 | B1 | * | 1/2011 | Redi    | 709/217 |
| 2003/0058269 | A1 | * | 3/2003 | Dunstan | 345/734 |
| 2008/0244680 | A1 | * | 10/2008 | Mochizuki | 725/133 |
| 2009/0239587 | A1 | * | 9/2009 | Negron et al. | 455/566 |
| 2010/0165216 | A1 | * | 7/2010 | Beals   | 348/734 |

FOREIGN PATENT DOCUMENTS

| JP | 2002095073 A | * | 3/2002 |
| WO | WO 2004/100003 |   | 11/2004 |
| WO | WO 2009/041676 |   | 4/2009 |

OTHER PUBLICATIONS

International Search Report and Written Opinion dated Nov. 26, 2010, PCT/WO2010/049028, 12 pages.

* cited by examiner

*Primary Examiner* — Chun-Kuan Lee
*Assistant Examiner* — Ronald Modo
(74) *Attorney, Agent, or Firm* — Ingrassia Fisher & Lorenz, P.C.

(57) ABSTRACT

Embodiments discussed herein are directed to an apparatus and method for relaying user input commands by a receiver to other devices connected to or in communication with the receiver. In one embodiment, a receiver receives one or more commands from a user input device and determines if the command is intended for the receiver or for a device in communication with the receiver. Based on this determination, the receiver may either execute the command or relay the command to a device that is attached or otherwise in communication with the receiver.

20 Claims, 8 Drawing Sheets

USER INPUT COMMAND RELAYING

TECHNICAL FIELD

Embodiments discussed herein are directed to a method and apparatus for relaying user input commands that are received at a receiver to devices that are in communication with the receiver.

BACKGROUND

Increasingly, home networking environments are extending network connectivity to a greater number of devices. By utilizing such network connectivity, a user may control a greater number of devices through a single input device. For example, a user input device, such as a remote control, may be used to issue commands to a television as well as other devices such a tuner, a stereo, and a game console. As the number of devices controlled by a user input device increases, the demands placed on its memory also increases. Specifically, the user input device would be required to store device-specific data needed to communicate with each networked device, as well as store memory intensive communication protocol stacks needed to communicate over the home network. These demands may be difficult to manage in a low cost device that has limited memory space.

SUMMARY

Embodiments discussed herein are directed to an apparatus and method for relaying user input commands received by a receiver to other devices connected to or in communication with the receiver. In one embodiment, a receiver receives one or more commands from a user input device and determines if the command is intended for the receiver or for a device in communication with the receiver. Based on this determination, the receiver may either execute the command or relay the command to a device that is attached or otherwise in communication with the receiver.

One embodiment is directed to a method of processing commands in a receiver having at least a signal receiver and a storage device, the receiver operable to receive a number of services from a program service, the method comprising: receiving a command, through a communication interface from a user input device, the command specifying a target device type; in response to receiving the command, parsing the command by a processor to correlate the target device type with a destination device, wherein the destination device is among a group of possible destination devices that includes the receiver itself and at least one external device that is in communication with the receiver; in response to parsing the command, determining, by the processor, if the destination device is an external device; if the destination device is not an external device, executing the command; and if the destination device is an external device, relaying the command to the destination device.

Another embodiment is directed to a receiver, comprising: a tuner operable to receive a number of services from a program service; an audio/visual processing module in communication with the tuner, the audio/visual processing module operable to transmit audio and visual signals decoded from a program service to an output device; a communication interface implementing at least a first communication channel with a user input device; and a processor in communication with the communication interface, the processor running computer executable code loaded into the processor from a tangible storage media, the computer executable code causing the processor to: determine if a command received via the first communication channel is directed to an external device; if the command is not directed to an external device, execute the command; and if the command is directed to an external device, relay the command to the external device.

Yet another embodiment is directed to a system, comprising: a receiver operable to receive a number of services from a program service and to transmit an audio and visual signal decoded from a program service to an output device; and a user input device in communication with a receiver, the user input device configured to: send receiver commands to the receiver, wherein the receiver executes the receiver commands; and send output device commands to the receiver, wherein the receiver relays the output device commands to the output device.

DETAILED DESCRIPTION

Embodiments discussed herein are directed to an apparatus and method for relaying user input commands by a receiver to other devices connected to or in communication with the receiver. In one embodiment, a receiver receives one or more commands from a user input device and determines if the command is intended for the receiver or for a device in communication with the receiver. Based on this determination, the receiver may either execute the command or relay the command to a device that is attached or otherwise in communication with the receiver.

As used herein, a "receiver" may be any device capable of receiving video and/or audio content included in a broadcast or other program service transmission from a service provider. For example, a receiver may include a set-top box, a cable box, a television, a raster that receives streaming video general purpose computer, and so on. As used herein, a service provider may include any service that provides a program service transmission to a receiver such as, without limitation, a satellite television service, a direct television service or a cable television service. It should be understood that the term "program service transmission" generally embraces not only satellite or terrestrial broadcasts, unicasts and/or narrowcasts but also transmission of information across any wired or wireless transmission medium. Accordingly, a "program service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency (including satellite) or infrared network, and so on.

Figure 1:
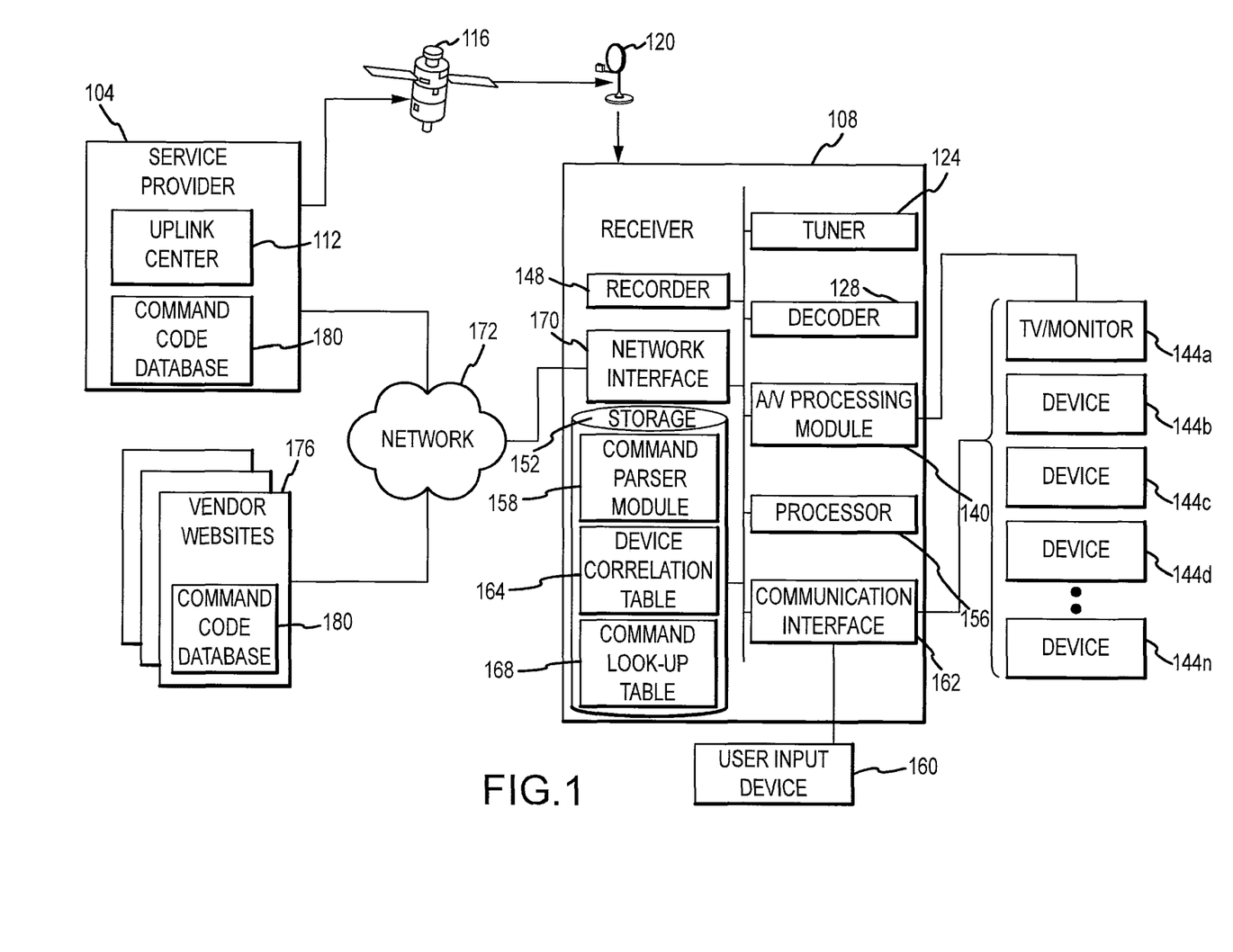
FIG. 1 is illustration of an operating environment showing components and features of implementations discussed herein.

FIG. 1 is a schematic illustration of a general operating environment showing components and features of embodiments discussed herein. FIG. 1 includes a service provider 104 that transmits or otherwise provides a program service transmission to a receiver 108. The receiver 108 may be associated with an individual, business or other entity, user or subscriber that receives a program service transmission from the service provider 104. The program service transmission may be received through a subscription to the service. Generally the terms "user" and/or "subscriber" refer to an individual or company who receives a program service transmission. This may include those who have purchased a subscription to the program service transmission. Alternatively, the terms "user" and/or "subscriber" may refer to individuals who have been given access to the program service transmission through promotional offers and/or other non-fee-based agreements.

In connection with embodiments that operate in the context of a satellite television service, the service provider 104 may provide a program service transmission through an uplink center 112. Implementations discussed herein may utilize a direct broadcast satellite (DBS) system which can incorporate packetized transmission signals according to an appropriate standard, such as the MPEG-2 and/or MPEG-4 standards. The uplink center 112 may include a transmitter or other equipment operable to transmit a modulated signal having data representing audio and/or visual content. The modulated signal may be received at a satellite 116, which in turn retransmits the modulated signal to be received at one or more terrestrial locations. The retransmitted signal may be received from the satellite 116 at one or more satellite dishes 120, which are typically associated with one or more receivers 108. A receiver 108 may include a tuner 124 operable to receive the program service transmission signal through the satellite dish 120 and a decoder 128 to decode the received signal. The decoder 128 may be programmed to decrypt, demodulate, demultiplex or otherwise decode some or all of the received signals in accordance with purchases and selections made by a user. Output from the decoder 128 may be directed to an audio visual (A/V) processing module 140. The A/V processing module 140 may process the video and audio streams using digital-to-analog conversion techniques, or compressed digital to uncompressed digital conversion techniques, to produce one or more output signals Again, it should be noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver 108 may communicate over a communication path that includes various combinations of local and wide area networks, coaxial cable, fiber optics and/or the Internet.

The receiver 108 may include or be associated with a recorder 148, such as a Digital Video Recorder (DVR). The recorder 148 may be integrated into the receiver 108, or it may be a stand alone device. The recorder 148 may be operated by a user who programs the device or receiver function to record a particular program at a specified time. The recorder 148 may be operable to record both video and audio channels or services. When the program occurs, the recorder 148 will record and store the program, which can then be viewed and/or heard by a user at a convenient time. In addition to this functionality, the recorder 148 may buffer a certain amount of content during a live transmission. Buffering a live transmission allows a user to pause and/or rewind the content of the transmission and to then display the content in a non-live or delayed manner.

The receiver 108 may include or be associated with a memory or other storage device 152, such as magnetic or optical storage. The storage device 152 may be operable to store data received from the decoded broadcast signal. The storage device 152 may be volatile or non-volatile memory implemented using any suitable technique or technology such as, for example, random access memory (RAM), disk storage, flash memory, solid state and so on. The storage device 152 may be located within the receiver 108 or separately from the receiver 108. The storage device 152 may removable in nature. The stored data set may include audio and/or visual content to be transmitted and output through the TV/monitor 144a or other device output device. Generally, audio/visual content may include still images, video images, animation and/or audio. Portable Network Graphics (PNG) or other appropriate formats, such as for example, Tagged Image File Format (TIFF), Joint Photographic Experts Group (JPEG), Motion Picture Experts Group (MPEG)-2, MPEG-4 may be used to display an image or video.

The receiver 108 may additionally include a processor 156 operable to run executable code in connection with various functions associated with the receiver 108. For example, the processor 156 may display graphics, images, animations or other content through the TV/monitor 144a. The processor 156 may be further operable to recall and display stored content, such as a purchased or recorded audio tracks or programs. The storage device 152 may store a module, application, file, or other data that is useable by the processor 156. As used herein, a module includes processor executable code that may be run to carry out one or more functions associated with the receiver 108. "Processor executable code" includes any computer-readable media or commands that may be ultimately interpreted by a processor, such as HTML or XML files that are rendered into user-viewable applications by an application executed by the processor 156. In one instance, a command parser module 158, which is stored in the storage device 152, may be executed by the processor 156 to execute and/or relay commands received from the user input device 160.

As used herein, a "user input device" may include any device operable to receive input from a user and to convey the input to the receiver 108. In one embodiment, the user input device 160 may be a hand-held device such as a remote control having a number of buttons or keys that when actuated by a user cause the user input device to convey information to the receiver 108 using a suitable wireless communication signal. Wireless signals that are sent to or received from the user input device 160 may be processed through a communication interface 162 associated with the receiver 108. The communication interface 162 may be operable to send and receive wireless signals such as radio frequency signals or infrared signals. The user input device 160 may include a pointing device or functionality that allows the user to control the position of a cursor that is displayed on the TV/monitor 144a. For example, the user input device 160 may include a track ball or glide plane that may be manipulated to control cursor movements. The user input device 160 may include a motion sensor or accelerometer that allows a user to control displayed items or graphics, such as a cursor, through movements of his or her hand or arm that cause a displacement of the user input device 160. It should be appreciated that other input devices such as a computer mouse, capacitive touchpad or touch screen may be used and other communication means, wired or wireless may be used.

Commands sent to the receiver 108 by the user input device 160 may be directed to the receiver 108 itself or to devices that are in communication with the receiver 108. Among other functions, the command parser module 158 may process a command received from the user input device 160 and determine the destination of the command. A command may have an external or an internal destination. As used herein, an "internal" command is one that is executed by the receiver 108 or a component of the receiver 108. As used herein, an "external" command is one that is relayed to a device 144a-n that is communication with the receiver 108. Commands sent to the receiver 108 for internal execution by the receiver may include, for example, a command to change the output channel, a command to pause and/or rewind an output program, and a command to record a particular program through the operation of the recorder 148. Commands sent to the receiver 108 for external execution by a device in communication with the receiver may include, for example, a command to change the volume on the TV/monitor 144a. As shown in FIG. 1, the receiver 108 may be in communication with the TV/monitor 144a through signal sent through the communication interface 162. In addition to the TV/monitor 144a, the receiver may communicate with a number of other devices 144b-n through signals sent through the communication interface 162.

The command parser module 158 may be provided in association with one or more data structures that assist in processing a particular command. Commands that are received from the user input device 160 may specify that the command is to be executed by a device of a certain type, while not necessarily specifying a particular device. A device correlation table 164 may be used by the command parser module 158 to determine a specific destination for a particular command received from the user input device 160. Once a specific destination is known, a command code look-up table 168 may be used by the command parser module 158 to determine a device-specific command code. As used herein, a "device-specific command code" refers to a code that is recognized by particular device such that when the code is received by the particular device the device is a caused to execute a particular function. In this regard, installing or otherwise configuring a particular device to interoperate with the receiver 108 may include programming the receiver 108 with certain device-specific command codes used to convey commands to the device. Alternately, the receiver 108 may contain a database of device specific commands and set-up would consist of selecting which command set(s) to use. Operations of the command parser module 158 that serve to execute or relay a command from the user input device are described in greater detail below.

A particular receiver 108 may include a network interface 170. The network interface 170 may be generally operable to communicate or send information across a network 172. In accordance with certain embodiments discussed herein, the network interface 170 may include a modem. Using a modem, the receiver may communication over a network 172 that includes standard telephone lines associated with the public switched telephone network (PSTN). However, it should be appreciated that the network 172 may include any type of network capable of data communication, such as for example, a local or wide area network, cell phone network or the Internet. In this regard, the receiver 108 may communicate through the network interface 170 using any suitable communication protocol such as TCP/IP. Through the network interface 170, a user may communicate with the service provider 104 to change his or her account status including taking such actions as adding or canceling channels and/or ordering pay-per-view content. The network interface 170 may additionally be used to facilitate communication between the receiver 108 and a central remote command code database 180. In certain implementations, the remote command code data base may reside on the receiver 108 and may be updated periodically by the service provider 104.

It may be the case that the receiver 108 does not have a particular device-specific command code or code set needed to execute a particular command on one of the devices 144a-n that are in communication with the receiver 108. Here, the command parser module 158 or other system component may issue a network transaction to acquire the appropriate device-specific code. The device-specific code(s) may be acquired from a database that is maintained at the service provider 104 or at a vendor website 176. In some embodiments, a device specific command code or code set may be transmitted to the receiver 108 from the uplink center 112 by way of a satellite 116.

Figure 2A:
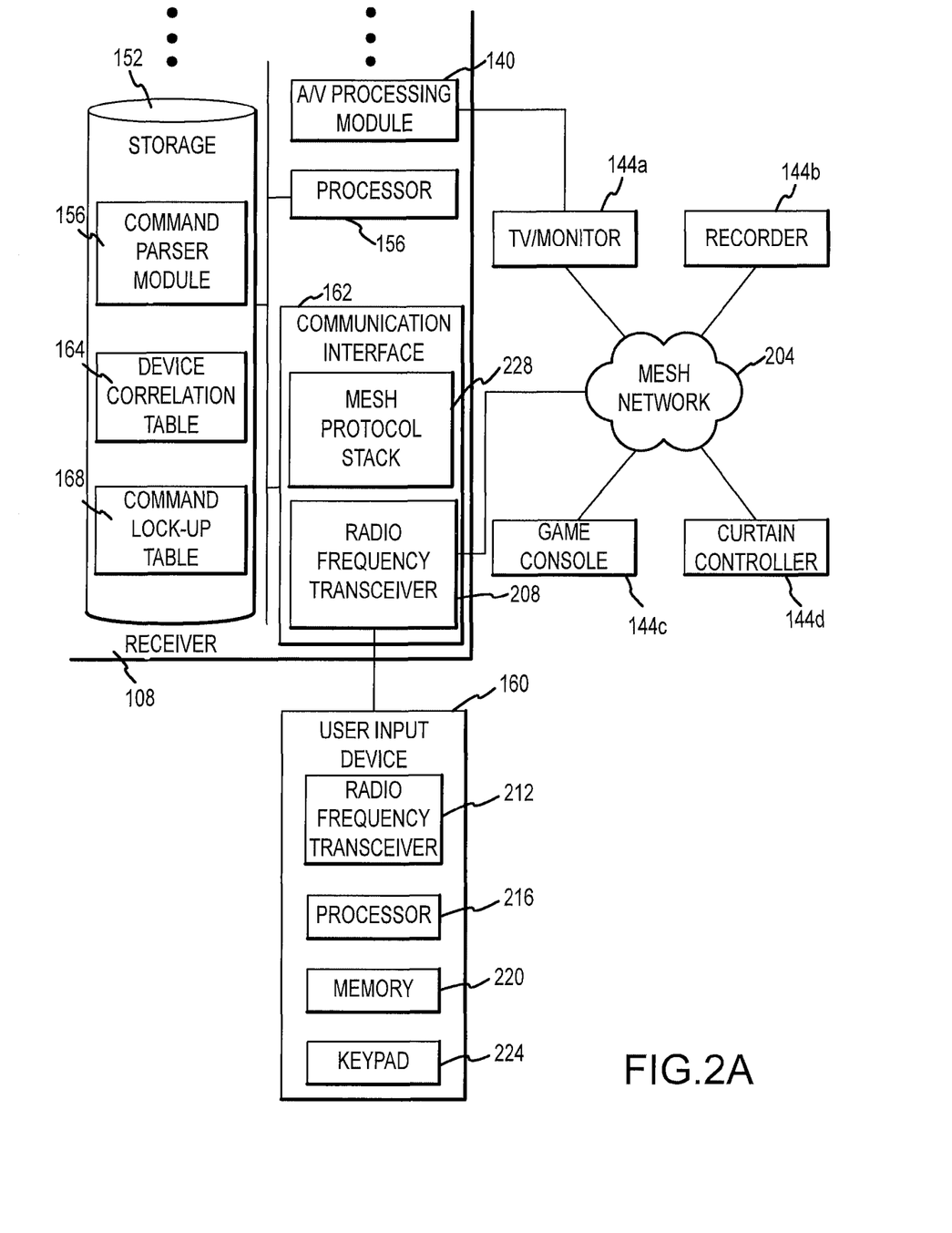
FIG. 2A-2C are illustrations of embodiments of the command interface shown in FIG. 1.

In FIG. 2A, an embodiment in accordance with implementations discussed herein is shown that includes a number of devices 144a-d interconnected through a mesh network 204. As used herein, a "mesh network" refers to a network architecture that utilizes different nodes of the network to relay communications or portions of communications between nodes of the network. For example, a communication between a first and second network node may be relayed or otherwise routed through one or more other network nodes. The term "mesh network" is used herein is distinguished from a point-to-point network, which includes communications that occur directly between a sending node and a receiving node. In one embodiment, the mesh network is implemented with the "ZigBee" networking protocol. As shown in FIG. 2A, the receiver 108 is a node on the mesh network 204. Communications between the various nodes of the mesh network 204 may be wireless and may be implemented using radio frequency signals. Accordingly, the communication interface 162 of the receiver 108 may include a radio frequency transceiver 208. The radio frequency transceiver 208 may be operable to send and receive communications to devices 144a-d by way of radio frequency signals sent across the mesh network 204. By way example not limitation, the mesh network shown in FIG. 2A interconnects the receiver 108 to a TV/monitor 144a, a recorder 144b, a game console 144c, and curtain controller 144d.

FIG. 2A additionally shows various components associated with the user input device 160. Like the receiver 108, the user input device 160 may include a radio frequency transceiver 212. Additionally, the user input device 160 may include a processor 216 and a memory 220. The memory 220 may include processor executable code that is executed by the processor 216 in connection with sending and/or receiving commands to the receiver 108 through the radio frequency transmitter 212. A user may input commands into the user input device 160 through the operation of for example the keypad 224. In contrast to the devices 144a-d, the user input device 160 may communicate using a point-to-point communication protocol with the receiver 108. In one embodiment, the communication protocol between the user input device 160 and the receiver 108 is the RF4CE communication protocol. By using the techniques described herein, a command may be sent from the user input device 160 to a device 144a-d on the mesh network 204 by way of a signal sent to the receiver 108 using a point-to-point protocol.

In communicating with the receiver 108, the user input device 160 may transmit commands that are designated for execution by the receiver 108 or designated to be relayed by the receiver 108 to one or more devices 144a-d that are in communication with the receiver 108 over the mesh network 204. In this regard, the command parser module 158 may process commands received through the communication interface 162 and determine their final destination. With respect to commands that are internal, the command parser module will cause those commands to be executed by the receiver 108. For commands which are designated for an external destination, the command parser module will format a mesh network communication which includes a device specific command code and transmit that communication across the communication network 204. In connection with transmitting the command code(s), the communication interface 162 may run a mesh protocol stack 228 as part of its operation. The mesh protocol stack 228, which is used to relay commands over the mesh network 204, may additionally be called upon by other network devices to relay commands or portions of commands to other devices on the mesh network 204. Through the operation of the command parser module 158 and communication interface 162, the user input device 160 is provided with the functionality of accessing devices on the mesh network 204 without needing to run a full mesh protocol stack. In locating the mesh protocol stack 228 and device specific information such as commands in a command lookup table 168 on the receiver 108, valuable storage space is saved on the user input device 160.

In some embodiments, the point-to-point protocol implemented between the user input device and the receiver allows for two-way communication. In this regard, the user input device 160 may issue a command to the receiver and once the command is received, the receiver 108 may send a confirmation message to the user input device 160. In some instances the confirmation message may be sent as a result of the device in the mesh network confirming receipt of the mesh network command. In this way, two-way communication between the user input device 160 and the receiver 108 allows the user input device 160 to refrain from issuing multiple communications in connection with sending a particular command.

Figure 2B:
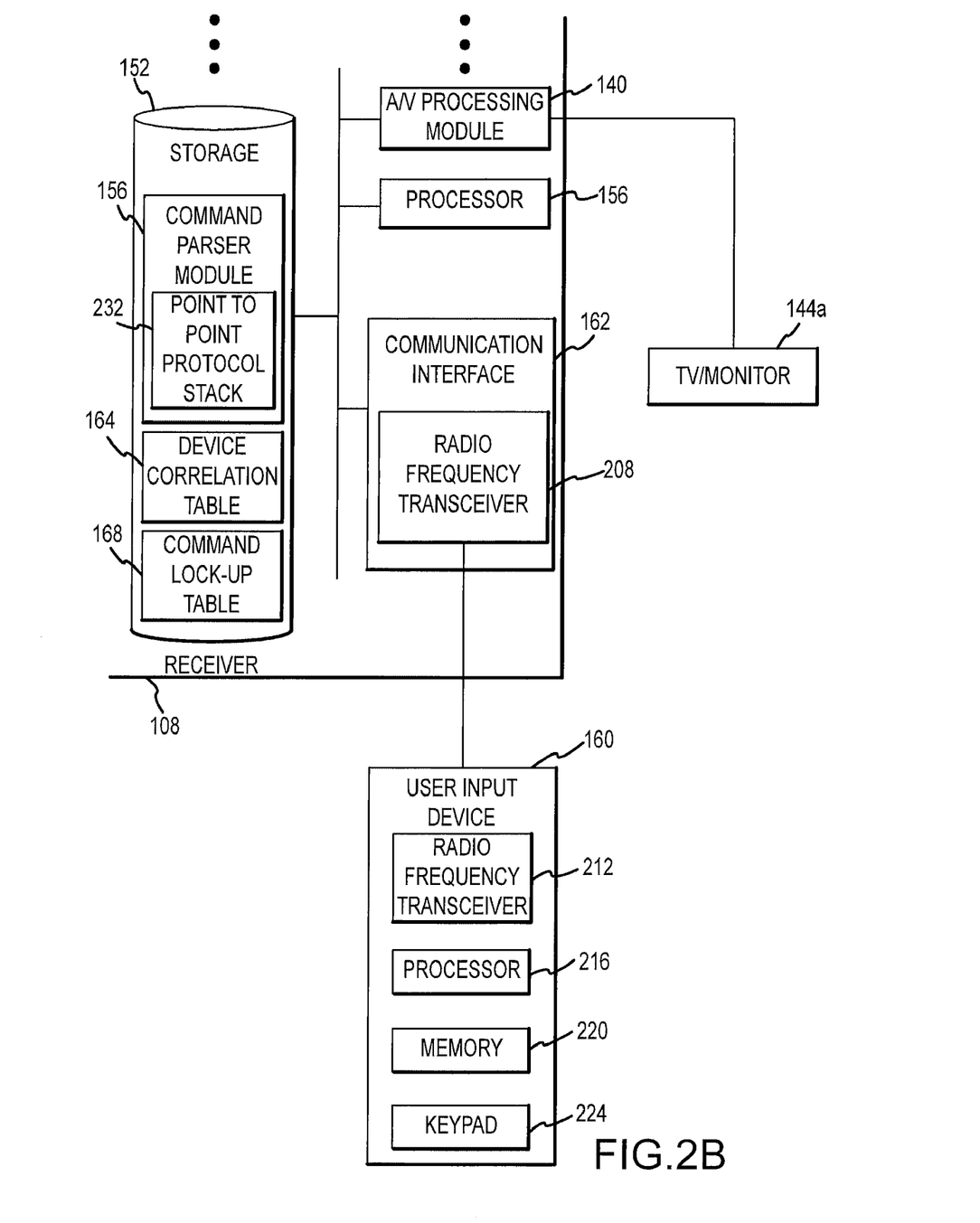

In FIG. 2B, an embodiment in accordance with implementations discussed herein is illustrated. The embodiment shown in FIG. 2B utilizes a point-to-point communication protocol between the receiver 108 and the TV/monitor 144a. In the embodiment shown in FIG. 2B, commands are sent to the TV/monitor 144a from the receiver 108 along a communication path that includes audio/visual signals. In one embodiment such a path may be implemented using a High Definition Multimedia Interface ("HDMI") cable. Such a cable may carry both audio and video signals between the AV/processing module 140 and the TV/monitor 144a. In addition to these signals, the HDMI cable may also include command signals that may be sent by the receiver 108 and executed by the TV/monitor 144a such as those defined by the Consumer Electronics Controls (CEC) appendix to the HDMI specification. In determining that a particular command is destined for the TV/monitor 144a, the command parser module 158 may format a communication including a device specific command and format the communication in a point-to-point protocol stack which may be a portion of the command parser module 158.

In other embodiments, the method of FIG. 2B could be implemented with point-to-point wireless protocols to communicate commands between the TV and the receiver. The point-to-point protocol used could be any wireless technology such as "WiFi", "Bluetooth", "RF4CE" or any of the numerous proprietary protocols. In this way the user input device 160 may command the TV/monitor without having specific knowledge of the TV or of the communication protocols and/or technologies used.

Figure 2C:
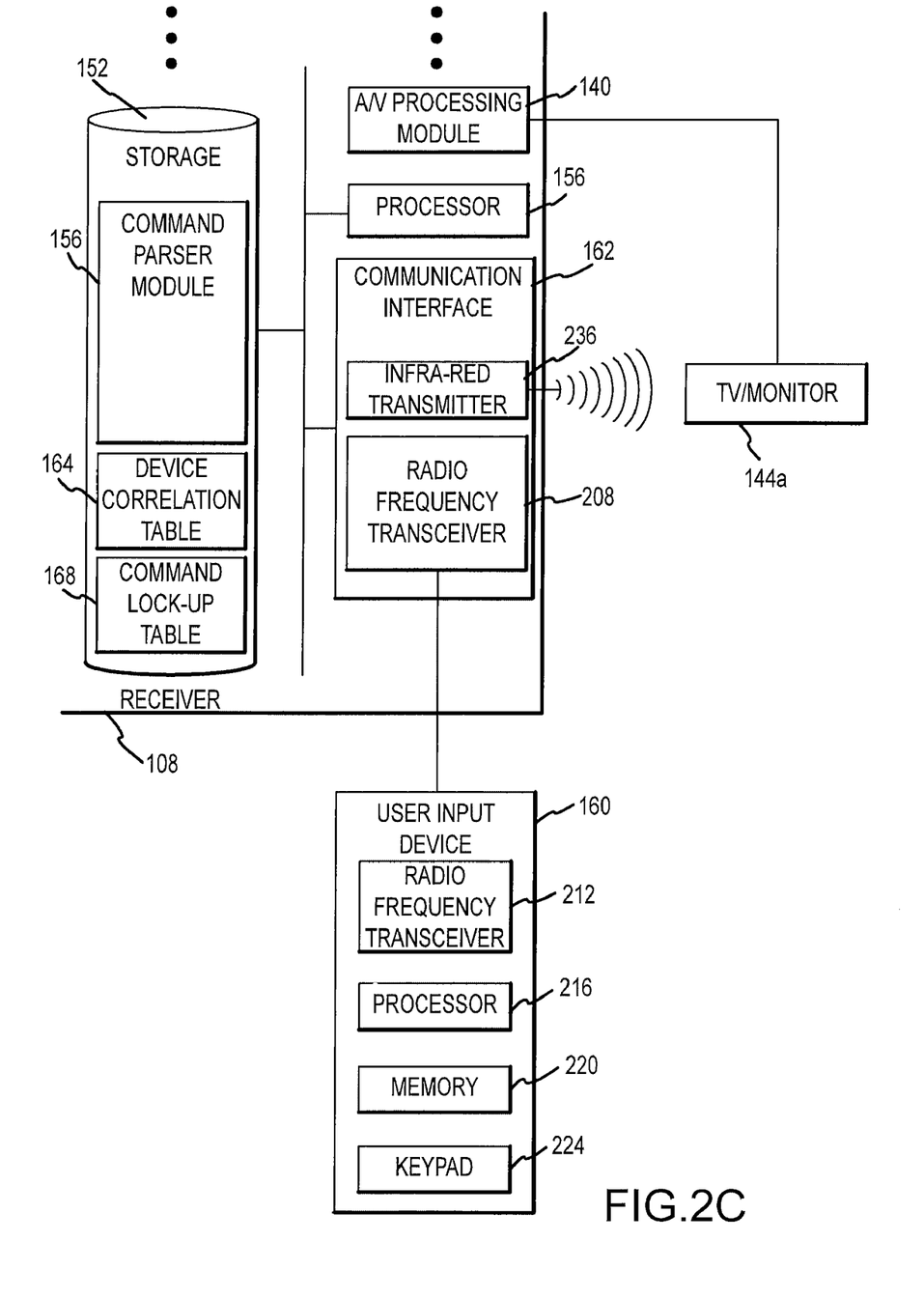

FIG. 2C is an illustration of an embodiment in accordance with implementations discussed herein. The embodiment illustrated in FIG. 2C includes a TV/monitor 144a which receives commands through an infrared ("IR") receiver. In this regard, the receiver 108 may include an infrared transmitter 236 operable to send commands to the TV/monitor 144a. In the embodiment shown in FIG. 2C, the command parser module 158 is operable to receive commands from the user input device 160 and relay them if necessary through the infrared transmitter 236 to the TV/monitor 144a. In this way the user input device 160 may command the TV/monitor 144a without having to incorporate an infrared transmitter. Among other advantages, this may allow the user input device 160 to remain backwardly compatible with older televisions without needing to incorporate certain hardware elements.

Figure 3:
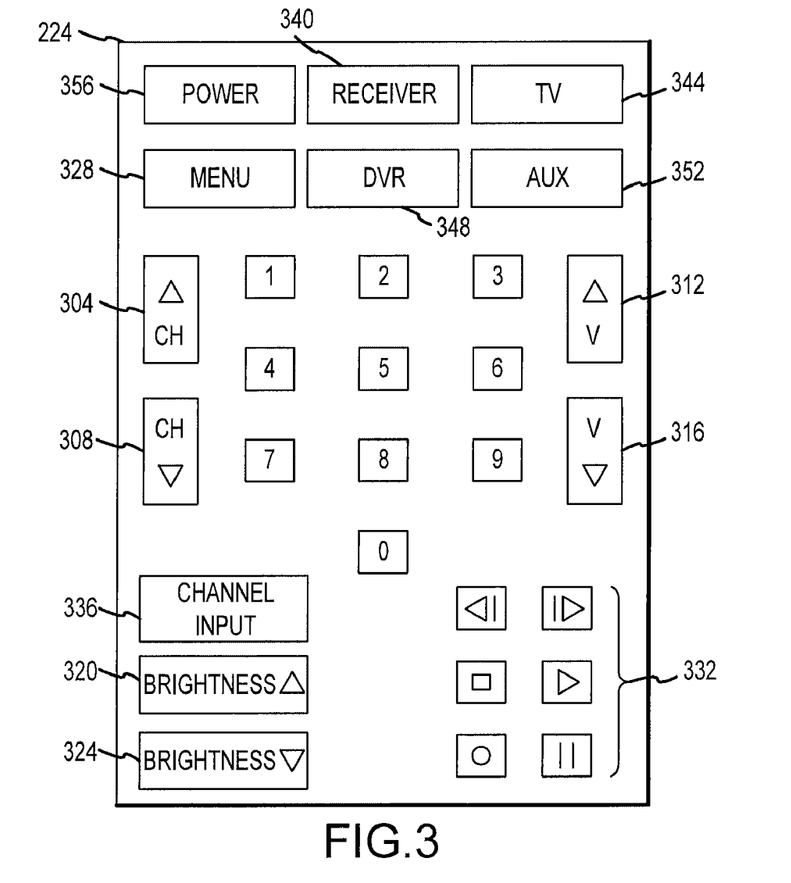
FIG. 3 is a further illustration of the user input device keypad shown in FIG. 2A.

FIG. 3 is an illustration of an example keypad 224 which may be used to input commands into the user input device 160. The keypad 224 includes a number of command buttons that specify a particular action to be taken by a device. Examples of command buttons are the channel up 304 and channel down 308 buttons. By pressing the channel up button 304, the user causes the user input device 160 to send a command to the receiver 108 specifying that the channel currently decoded should be changed upwardly. The volume up button 312 and the volume down button 316 cause commands to be sent specifying a change in volume. The brightness up 320 and brightness down 324 command buttons cause commands to be sent specifying that the brightness of the display should be changed. The menu 328 command button causes a command to be sent specifying that a menu should be displayed. DVR command buttons 332 cause a specific DVR related commands to be sent, such as, for example stop, play, rewind and so on. A channel input 336 command button causes the user input device 160 to send a command specifying that the source of an input be changed.

In contrast to command buttons, the keypad 224 may include a number of "target device buttons." Target device buttons shown in FIG. 3 include a receiver button 340, a TV button 344, a DVR button 348 and an auxiliary button 352. A target device button may be pressed in combination or in succession with a particular command button to specify a particular device to execute the command associated with the command button. Target device buttons may be used to distinguish among different devices which may be operable to execute a particular command. For instance, both the receiver 108 and the TV/monitor 144a may be operable to execute a channel up command. Pressing receiver button 340 may place the user input device 160 in a mode that directs commands to the receiver 108. In this way, when a user presses the channel up button 304, the user input device 160 will issue a channel up command directed to the receiver 108. If instead the user wishes to issue the channel up command to the TV/monitor 144a, the user may press the TV button 344 followed by the channel up button 304.

While the different commands may be communicated using various binary codes transmitted between the user input device 160 and the receiver 108, such commands are represented herein with the following notation: command(destination). For example a channel up command directed to the receiver 108 is specified with the following notation: channel_up(receiver). A channel up command issued to the TV is represented by the following: channel_up(TV). It may be the case that in issuing commands through the keypad 224, a user may not press a particular target device button to specify a particular target device. In this instance, the user input device 160 may not be placed in any particular mode (as opposed to defaulting to the previous mode). Therefore, pressing a command button may result in the user input device 160 transmitting a command without a particular target device specified. This type of command is represented herein with the notation: command(null). For example, a channel up command which specifies no particular target device is represented as follows: channel_up(null). It may be the case in certain embodiments that the user input device 160 does not specify a particular target device in its communication with the receiver 108, if the particular command sent by the user input device 160 could only be interpreted as pertaining to a particular type of target device. In one example, a command issuing from user actuation of the DVR buttons 332 may be interpreted as pertaining only to a recorder or DVR-type device. In certain embodiments, commands may be issued by the user input device 160 in a way that specifies that all associated devices are to execute the command. In one embodiment, pressing the power button may cause the user input device 160 to communicate to the receiver 108 a power on command that is to be executed by all associated devices. Such a command is referred to herein with the following notation: command(all). In this specific example of a power on command, the command is referred to as follows: power_on(all).

It is noted that the target device buttons on the keypad 224 may specify a target device type and not necessarily a particular device that will ultimately be the destination of the command. The final destination of the command may be determined by an operation of the command parser module 152 that references a device correlation table 168. The device correlation table 168 may contain a list, record, or other data structure that defines correlations between target device types received as part of user input commands and particular destination devices. As used herein, a "destination device" is a device that is designated by the receiver to receive user input commands that specify a particular target device type. A destination device may be a device, such as one of devices 144a-n, that is in communication with the receiver 108 through the communication interface 162. The receiver 108 itself may also be a destination device.

Figure 4:
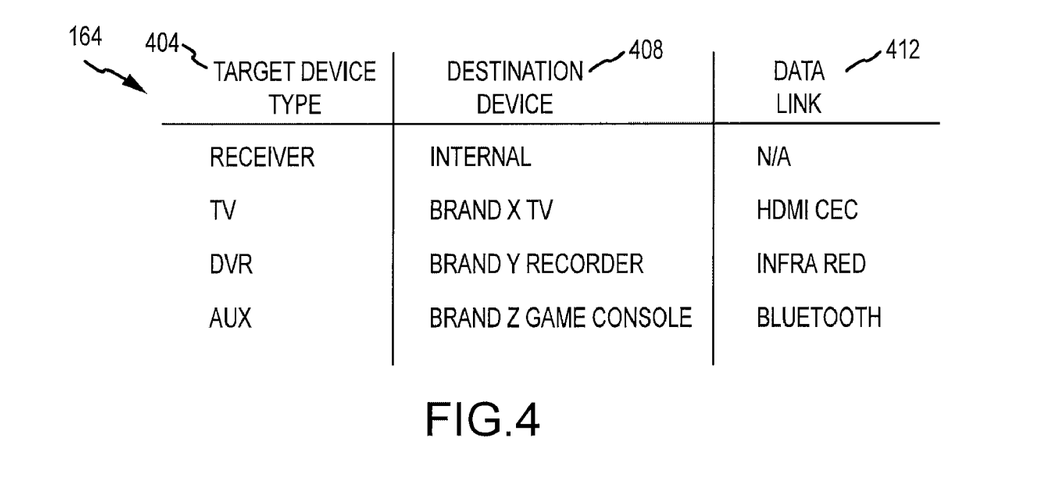
FIG. 4 is a further illustration of the device correlation table shown in FIG. 1.

FIG. 4 includes a device correlation table 164 having a first column 404, a second column 408 and a third column 412. The first column 404 includes a number of target device types, each of which may be included as part of a user input command received from the user input device 160. Each target device type in column 404 corresponds to a destination device listed in column 408 and a link listed in column 412. By way example, say that the TV/monitor 144a is television of a certain make and model. The device correlation table 164 will then correlate the target device type "TV" will the specific television associated with the receiver 108, in this example a "BRAND X" TV and HDMI CEC. Accordingly, the command parser module 158 may use the device correlation table 164 to determine that commands directed to a TV are to be directed to the particular BRAND X TV television set that is attached to the receiver 108. It should be noted that the correlations maintained by the device correlation table 164 may be altered or otherwise programmed by a user. In the example shown in FIG. 4, the device correlation table 164 is programmed to route DVR commands to an external recorder 144b, in this example a "BRAND Y" recorder using an IR data link. However, the device correlation table 164 may be reprogrammed to direct DVR commands to the internal recorder 148. The device correlation table 164 may list a particular target device type as corresponding to an "internal" destination device. This correlation indicates that the receiver itself 108 will execute the command.

Figure 5:
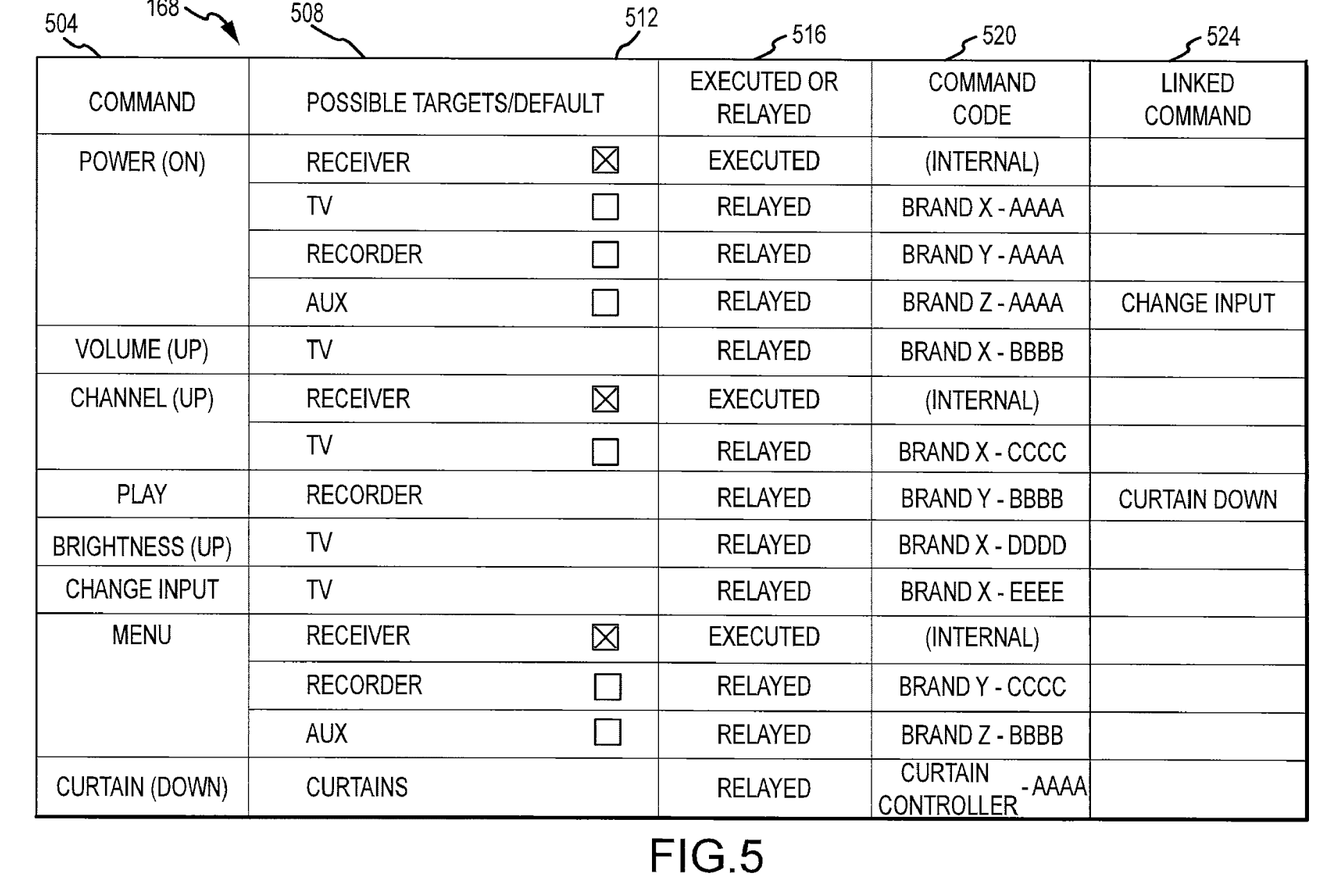
FIG. 5 is a further illustration of a command look-up table shown in FIG. 1.

FIG. 5 includes a command lookup table 168, which may be used by the command parser module 158 to acquire device-specific command codes. The command lookup table 168 includes a first column 504. Column 504 includes a number of commands, at least some of which correspond to commands that may be sent by the user input device 160 when a user presses a command button on the keypad 224. Column 508 includes a listing of possible target devices associated with each command. In some instances, a command may be possibly associated with a number of target devices. By way of example, a power_on command may be executed by a number of devices such as the receiver 108, the TV/monitor 144a, the external recorder 144b, or the game console 144c. In certain instances, a command may be potentially associated with only a specific device. By way of example, the volume_up command may be associated potentially with only the TV/monitor 144a.

For those commands which may be associated with more than one possible target device, the command lookup table 168 may specify a designated default device. In FIG. 5 the default device for a particular command is indicated by checkboxes 512. By way of example, the checkboxes 512 indicate that the receiver 108 is designated as the default device for the power_on command. For those commands received from the user input device 160 that do not specify a particular target the command parser module 158 may assign the default device to such a command.

As shown in FIG. 5, column 504 may additionally include one or more commands that do not correspond to any command issued by the user input device 160. Such commands may be specific to certain devices that are in communication with the receiver 108. With specific reference to the mesh network 204 shown in FIG. 2a, such a device may include a curtain controller 144d. The curtain controller 144d may be operable to raise and lower curtains which are disposed on windows in a room containing the TV/monitor 144a. The curtain controller 144d may include network connectivity that allows commands to be sent to it from across the mesh network 204. Accordingly, the receiver 108 may issue a command across the mesh network 204 commanding that the curtain controller 144d to raise or lower the associated window curtains. In some embodiments, the user input device 160 may be programmed to issue commands to the curtain controller 144d through its communication with the receiver 108. In other embodiments described below, the receiver 108 may issue commands to the curtain controller 144d in connection with issuing related commands to other network devices 144a-c. In certain embodiments, commands may be sent based upon user defined timers. For example, a timer may be set that operates to close the window curtains at certain time of day. Such a timer would cause the receiver 108 to send a command to the curtain controller 144d to lower the curtains if they are not already lowered.

The command lookup table 168, shown in FIG. 5, additionally includes column 516 that specifies whether a particular command is to be executed or relayed by the receiver 108. Column 516 may include an entry corresponding to each possible target associated with a particular command. This is the case because whether a particular command received from a user input device 160 is executed or relayed may depend on the destination of the command. By way of example, consider the power_on command. If the receiver 108 receives a power_on(receiver) command, then the receiver 108 will execute the command. In contrast, if the receiver 108 receives a power_on(TV) command, then the receiver 108 will relay the command to the TV. It should be noted here that certain commands may be both executed and relayed. For example, the power_on(all) command will be executed by the receiver 108 and any devices 144a-n which are in communication with the receiver 108. Additionally the receiver may be configured to, for example, automatically send the power on command to the TV upon receiving the power_on(receiver) command and powering itself on.

The command lookup table 168 shown in FIG. 5 additionally includes column 520 that includes device-specific command codes. With respect to each possible target for a particular command, column 520 may include a particular device-specific command code. By way of example, the command "BRAND X TV-AAAA" specifies the command code required to cause the TV/monitor 144a to power on. Similarly, column 520 includes device-specific power on command codes for the recorder 144b and the game console 144c. The column 520 may be populated with device-specific command codes by the command parser module 158 or other component, based on the device correlation table 164. Specifically, when a particular target device type is associated with a particular destination, the command parser module 158 or other component may acquire command codes necessary to execute user input commands through network transactions issued to a command code database, which may be associated with the service provider 104 or certain vendor websites 176. For those commands that are executed by the receiver 108, the column 520 may omit a specific command code. More particularly, commands executed by the receiver 108 may need to reference a device-specific command code as they are executed internally.

The command lookup table 168, shown in FIG. 5 may additionally include column 524 that lists one or more linked commands. As used herein, a "linked command" refers to a particular command that is issued following the execution of a first command. By way of example, a power_on(AUX) command, which is relayed to the game console 144c, may be linked to a change input command directed to the TV/monitor 144a. Here, if the game console 144c is powered on, the additional or linked command may change the channel input associated with the TV/monitor 144a in order to display input received from the game console 144c. In some instances, a linked command may be directed to a device not necessarily corresponding to a particular target device type recognized by the user input device 160. For example, the play(recorder) command, may be linked to a curtain_down command. Accordingly, once the receiver 108 receives a play(recorder) command, which is relayed to the recorder 144b, the receiver 108 may additionally relay a command to curtain controller 144d causing the curtain controller 144d to lower the associated window curtains.

Figure 6:
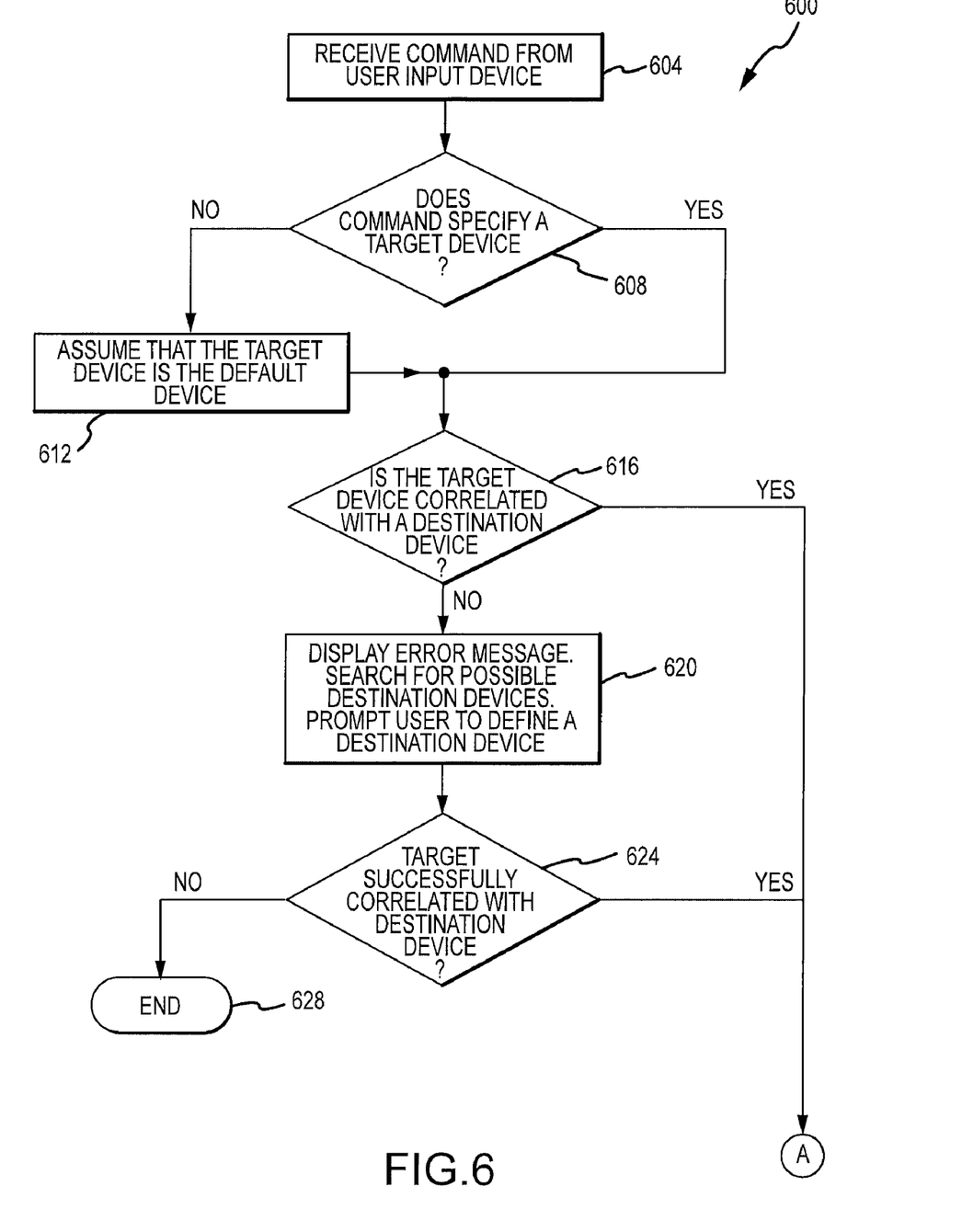
FIG. 6 is a flow chart illustrating a method in accordance with implementations discussed herein.

Turning now to FIG. 6, operations of the command parser module 158 will be explained with reference to flow chart 600. The method illustrated by flow chart 600 begins initially with operation 604 in which a user input command is received by the receiver 108 from the user input device 160. The user input command may include a command and a target device type associated with the command. The user input command may be sent to the receiver 108 from the user input device 160 through a point-to-point protocol such as RF4CE, implemented using radio-frequency signals. Following operation 604, operation 608 may be executed.

In operation 608, a determination is made as to whether the command specifies a particular target device. If, in operation 608, it is determined that the command does not specify a particular device, operation 612 may be executed. In operation 612, a default device may be assigned to the command received by the command parser module 158. If, in operation 608, it is determined that a device is specified by the command, operation 616 may be executed. In operation 616, a determination may be made as to whether the target device type is correlated with a particular destination device. Here, the command parser module 158 may reference the device correlation table 164 to determine the specific device that is correlated with the target device type. The destination device may be a device 144a-n, which is in communication with the receiver 108. Alternatively, the destination device may be the receiver 108 itself. If in operation 616, it is determined that the target device type is associated with a particular destination device, operation 704 in FIG. 7 may be executed. If in operation 616, it is determined that the target device type is not associated with a particular destination device, operation 620 may be executed.

In operation 620, the command parser module 158 may attempt to make a correlation between the target device type and a particular destination device. In operation 620 the command parser module 158 may display an error message on the TV/monitor 144a. With specific reference to the embodiment shown in FIG. 2A, the command parser module 158 may also search for possible destination devices through network transactions issued across the mesh network 204. Specifically, the command parser module 158 may determine a number of candidate devices that could possibly be correlated with a particular target device type. In determining such a correlation, the command parser module 158 may prompt the user to select or define a particular destination device through a popup or other message displayed on TV/monitor 144a. Following operation 620, operation 624 may be executed.

In operation 624, a determination is made as to whether the target device type is successfully correlated with a destination device. If no successful correlation is made, the method may end in operation 628. Once it is determined that a target device type is correlated with a destination device, operation 704, shown in FIG. 7, may be executed.

Figure 7:
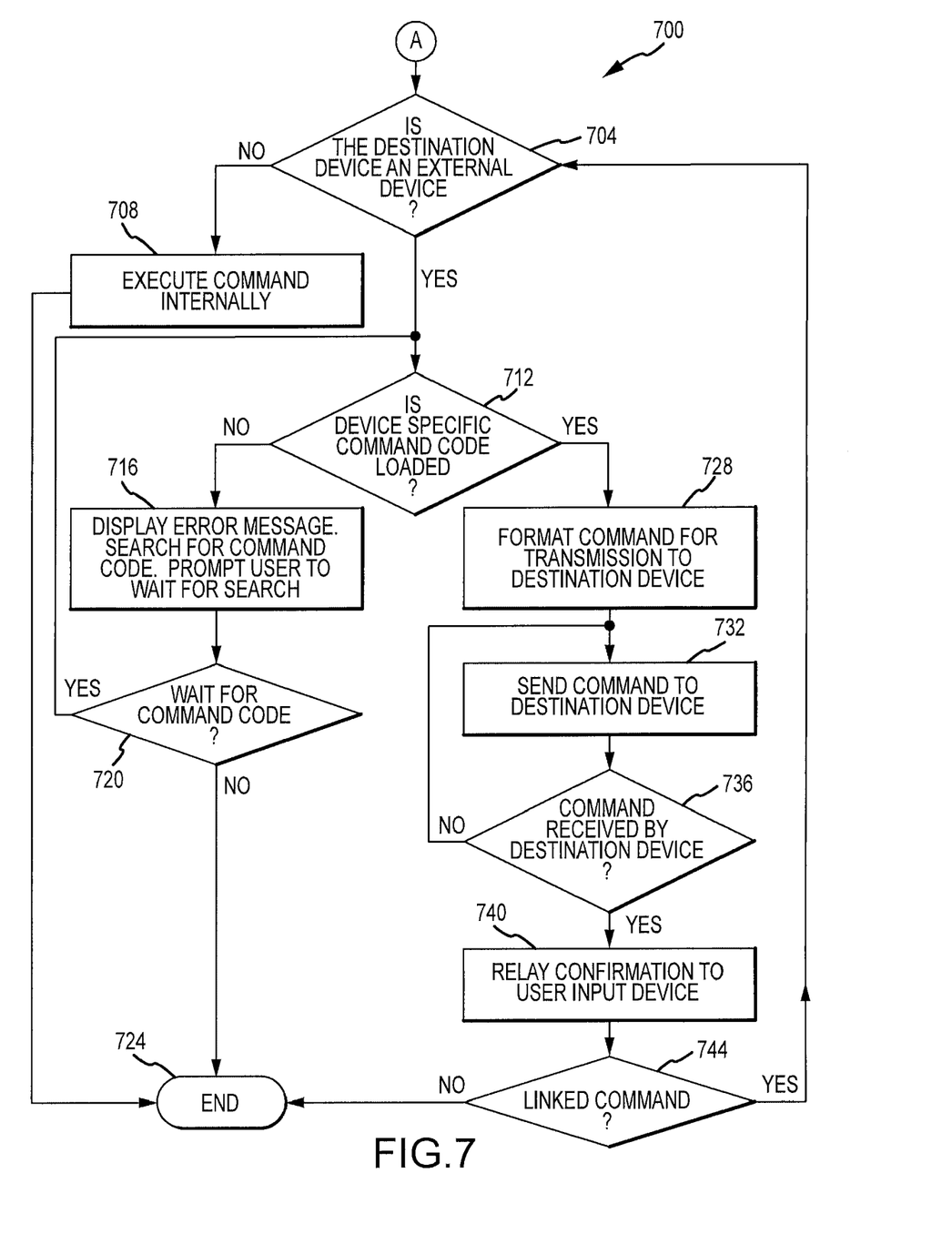
FIG. 7 is another flow chart illustrating a method in accordance with implementations discussed herein.

Further aspects of the operation of the command parser module 158 are illustrated in the flow chart 700 shown in FIG. 7. The method illustrated by flow chart 700 begins with operation 704. In operation 704, a determination is made as to whether the destination device is an external device. If, in operation 704, it is determined that the destination device is not an external device, operation 708 may be executed. In operation 708, the command received from the user input device 160 may be executed by the receiver 108 and the process ends. If, in operation 704, a determination is made that the destination device is an external device, operation 712 may be executed.

In operation 712, a determination is made as to whether a device-specific command code is loaded. Here, the command parser module 158 may make reference to a command lookup table. With reference to the example command lookup table 168 shown in FIG. 5, the command parser module 158 may refer to column 520, listing several device-specific command codes. If, in operation 712, it is determined that no device-specific command code is loaded, operation 716 may be executed.

In operation 716, the command parser module 158 may attempt to acquire the device-specific command code. In so doing, the command parser module 158 may display an error message to the user, visible on the TV/monitor 144a. Alternatively or in combination, the command parser 156 may issue one or more network transactions across the network 172 that are directed to certain command code databases 180. The command code database 180 may be associated with a service provider 104 or certain vendor websites 176, and may have command codes usable by certain devices 144a-n that are in communication with the receiver 108. In some instances, receiving a particular device-specific command code may take time. Accordingly, in operation 716, the command parser module 158 may prompt the user to determine if the user wishes to wait for the command code to be received by the receiver 108. In certain embodiments, this may include sending the command code at an appropriate time through a satellite signal sent by the uplink center 112 through the satellite 116. In such instances, the uplink center 112 may send the complete code set for the device in question. Following operation 716, operation 720 may be executed.

In operation 720, a determination is made as to whether the user will wait for the command code to arrive. If, in operation 720, it is determined that the user will not wait for the command code to arrive, the method may end in operation 724. If the user decides to wait for the command code to arrive, operation 712 may be executed. If, in operation 712, it is determined that the device-specific command code is loaded, operation 728 may be executed.

In operation 728, the command code is included in a transmission sent to the proper destination device. In certain embodiments this may include sending the command to a particular device 144*a-d*, through a transaction issued by way of the mesh protocol stack 228. In other embodiments a point-to-point protocol may be used. Using a point-to-point protocol such as HDMI, the command parser module 158 may send the command to the TV/monitor 144*a* through a pathway that includes audiovisual signals sent from the receiver 108. In embodiments which include devices using a point-to-point RF protocol such as Bluetooth or RF4CE, a particular command may be formatted and sent by way of an RF transmitter (either device 208 used to communicate with the user input device 160 or a different RF device). In embodiments which include devices that communicate using infrared, a particular command may be formatted and sent by way of an infrared transmitter 136 associated with the receiver 108. Following operation 728, operation 732 may be executed.

In operation 732 the formatted command is sent to the appropriate destination device. Following operation 732, operation 736 may be executed. In operation 736, the receiver 108 may wait for confirmation from the destination device regarding receipt of the transmitted command. If, in operation 736, no acknowledgement is received from the destination device, operation 732 may again be executed, wherein the command is sent an additional time. Some embodiments that use protocols such as IR do not typically include receipt confirmation mechanisms and thus would skip operation 736. If, in operation 736, a confirmation has been received, operation 740 may be executed. In operation 740, the confirmation may be relayed from the receiver 108 to the user input device 160 along the two-way communication path between the receiver 108 and user input device 160. Following operation 740, operation 744 may be executed.

In operation 744, a determination is made as to whether the command is associated with a linked command. Here, the command parser module 158 may make reference to the command lookup table, such as the one shown in FIG. 5, which includes a column 528 having a number of linked commands. If, in operation 744, it is determined that a command is so linked, operation 712 may again be executed. If, in operation 744, a determination is made that no command is linked (or no linked commands remain to be executed), operation 724 may follow and be method may end.

While embodiments of present invention are discussed herein in connection with the exemplary satellite broadcast system shown in FIG. 1, it should be appreciated that embodiments of the present invention may be used in connection other types of networks or content delivery mechanisms. Generally, the present invention includes content delivered from a provider to a receiver across or over a network. The network across which content may be delivered may include satellite system, such as the one shown in FIG. 1. Alternatively, the network may include a cable television network, local area network, wide area network or the Internet. In connection with certain embodiments, a receiver may include a general purpose computer operable to receive data or other content across a network, such as a wide area network of the internet. In such embodiments, the computer may be configured so that a provider can access a web site, a file transfer protocol (FTP) site, a file sharing system or site, and so on. Moreover, the order of method operations, such those shown in FIG. 6 and FIG. 7, described herein is by way of example and limitation. Certain implementations may reorder method operations without departing from the spirit and scope of the invention.

The invention claimed is:

1. In a receiver having at least a signal receiver and a storage device, the receiver operable to receive a number of services from a program service, a method comprising:
- receiving a communication, through a communication interface from a user input device, the communication including a command parameter and a target device type parameter;
- in response to receiving the communication, parsing the communication by a processor to correlate a target device type specified by the target device type parameter with a destination device, wherein the destination device is among a group of possible destination devices that includes the receiver itself and at least one external device that is in communication with the receiver;
- in response to parsing the communication, determining, by the processor, if the destination device is an external device;
- if the destination device is not an external device, executing a command specified by the command parameter; and
- if the destination device is an external device, relaying the command specified by the command parameter to the destination device.

2. The method of claim 1, wherein the target device type parameter specifies the target device type as a result of an operation of:
- assigning a default device type to the target device type parameter, wherein the target device type parameter did not specify a particular target device type when the communication was sent from the user input device.

3. The method of claim 1, wherein parsing the communication includes determining that the target device type is not correlated with a destination device, the method further comprising:
- transmitting a query to one or more external devices to determine one or more possible destination devices for the target device type;
- prompting a user to select a particular destination device for the target device type; and
- sending the command to the destination device selected by the user.

4. The method of claim 1, further comprising:
- accessing data stored in a memory to determine a device-specific command code for the destination device, the device-specific command code operable to cause the destination device to execute the command sent from the user input device, when the device-specific command code is transmitted to the destination device;
- wherein the operation of relaying the command to the destination device includes formatting a communication including the device specific command for transmission to the destination device using a communication protocol associated with the destination device.

5. The method of claim 1, further comprising:
determining that a device-specific command code is not present in a local storage device; and
sending a request for the device-specific code through a network transaction sent across a network, wherein the request is sent to at least one of a service provider or a manufacturer;
wherein the device-specific command code is operable to cause the destination device to execute the command sent from the user input device when the device-specific command code is transmitted to the destination device.

6. The method of claim 1, further comprising:
in response to relaying the command to the destination device, receiving confirmation from the destination device indicating that the destination device has received the command; and
in response to receiving confirmation from the destination device, relaying the conformation to the user input device.

7. The method of claim 1, further comprising:
accessing data stored in a memory to determine that a linked command is associated with the command, the linked command having a destination device; and
in response to determining that a linked command is associated with the command, determining, by the processor, if the destination device of the linked command is an external device;
if the destination device of the linked command is not an external device, executing the linked command; and
if the destination device of the linked command is an external device, relaying the linked command to the destination device of the linked command.

8. The method of claim 7, wherein the linked command is for a target device type that is not recognized by the user input device.

9. A receiver, comprising:
a tuner operable to receive a number of services from a program service;
an audio/visual processing module in communication with the tuner, the audio/visual processing module operable to transmit audio and visual signal decoded from a program service to an output device;
a communication interface implementing at least a first communication channel with a user input device, the communication interface configured to receive a communication from the user input device from across the first communication channel, the communication specifying a command and a target device type; and
a processor in communication with the communication interface, the processor running computer executable code loaded into the processor from a tangible storage media, the computer executable code causing the processor to:
evaluate the target device type to determine if the command received via the first communication channel is directed to an external device;
if the command is not directed to an external device, execute the command; and
if the command is directed to an eternal device, relay the command to the external device.

10. The receiver of claim 9, wherein the communication interface implements a second communication channel with the external device.

11. The receiver of claim 10, wherein the second communication channel is implemented with a point-to-point protocol and the processor is configured to run a point-to-point protocol stack.

12. The receiver of claim 10, wherein the first communication channel is a radio frequency channel and the second channel is an infrared channel.

13. The receiver of claim 10, wherein the second communication channel is a mesh network and the processor is configured to run a mesh protocol stack.

14. The receiver of claim 9, wherein the command is sent through the audio/visual module.

15. The receiver of claim 9, further comprising:
a look-up table stored in the tangible storage media, the look-up table having a number of device-specific command codes useable by the processor in relaying the command to the external device, wherein the device-specific command code is operable to cause the external device to execute the command sent from the user input device, when the device-specific command code is transmitted to the external device.

16. The receiver of claim 9, further comprising:
a network connection in communication with the processor, the network connection operable to allow the processor to send requests to a remote command code database for device-specific command codes.

17. The receiver of claim 9, wherein
the first communication channel is a two-way communication channel; and
the processor is configured to relay command confirmations received from the external device to the user input device across the first communication channel.

18. A system, comprising:
a receiver operable to receive a number of services from a program service and to transmit audio and visual signal decoded from a program service to an output device; and
a user input device in communication with receiver, the user input device configured to:
format a first communication having a command parameter that specifies a receiver command and a target device type parameter that specifies the receiver;
send the first communication to the receiver, wherein the receiver evaluates the target device type parameter to determine that receiver command is to be executed by the receiver and, based on this determination, executes the receiver command;
format a second communication having a command parameter that specifies an output device command and a target device type parameter that specifies the output device; and
send the second communication to the receiver,
wherein the receiver evaluates the target device type parameter to determine that the output device command is to be executed by the output device and, based on this determination, relays the output device command to the output device.

19. The system of claim 18, wherein the receiver is in communication with an additional device, the receiver configured to send commands to the output device and to the additional device across a mesh network, the user input device further configured to:
format a third communication having a command parameter that specifies an additional device command and a target device type parameter that specifies the additional device;
send the third communication to the receiver, wherein the receiver evaluates the target device type parameter to determine that the additional device command is to be executed by the additional device and, based on this determination, relays the additional device command to the additional device.

20. The system of claim 18, wherein the receiver comprises a computer readable storage medium including:

a number of device-specific commands codes operable to cause the output device to execute the output device command sent from the user input device, when the device-specific command code is transmitted to the output device; and a protocol stack operable to allow the receiver to send communications across a network that interconnects at least the receiver and the output device.

* * * * *